April 2, 1968  A. M. MESHULAM  3,375,853
PISTON VALVE SLIDE
Filed Aug. 16, 1965

INVENTOR
Avram M. Meshulam

BY
ATTORNEY

United States Patent Office 3,375,853
Patented Apr. 2, 1968

3,375,853
PISTON VALVE SLIDE
Avram M. Meshulam, 15 Linden Terrace,
Baltimore, Md. 21208
Filed Aug. 16, 1965, Ser. No. 479,920
5 Claims. (Cl. 137—494)

ABSTRACT OF THE DISCLOSURE

An improved slide valve, valve assembly and method of producing the same in which the valve is of a unitary construction and is produced with an annular flange at one end having a surface machined in relation to a continuous machine edge forming a part of a groove overlying a plurality of radial openings from the outer cylindrical guide surface of the valve and in which a fragmentary, cylindrical guide surface is formed at the end of the valve opposite the end upon which the annular flange is formed.

---

The present invention relates to an improved piston slide, or sleeve valve and is particularly efficient in the control of fluids passing through fluid transmission lines and is of long lasting durability in its use.

While similar valves are presently in use, they are subject to rapid wearing on their critical surfaces requiring frequent replacement. Also, the machining of those presently used valves require highly skilled labor.

One object of the present invention is to provide a valve structure that will reduce the wear on the critical valving areas of the valve.

Another object of the invention is to provide an improved method of machining the valve which will consolidate the number of machine operations.

A further object of the invention is to provide a method of machining the valve that will require only semi-skilled labor.

While several objects of the invention have been pointed out, other objects, uses and advantages will become more apparent as the nature of the invention is more fully disclosed, which consists in its novel construction and arrangement of its several parts illustrated in the accompanying drawings and described in the detailed description to follow.

In the drawings.

In referring to the drawings like and similar reference characters are used to indicate like and similar parts throughout the several views.

Figure 1:
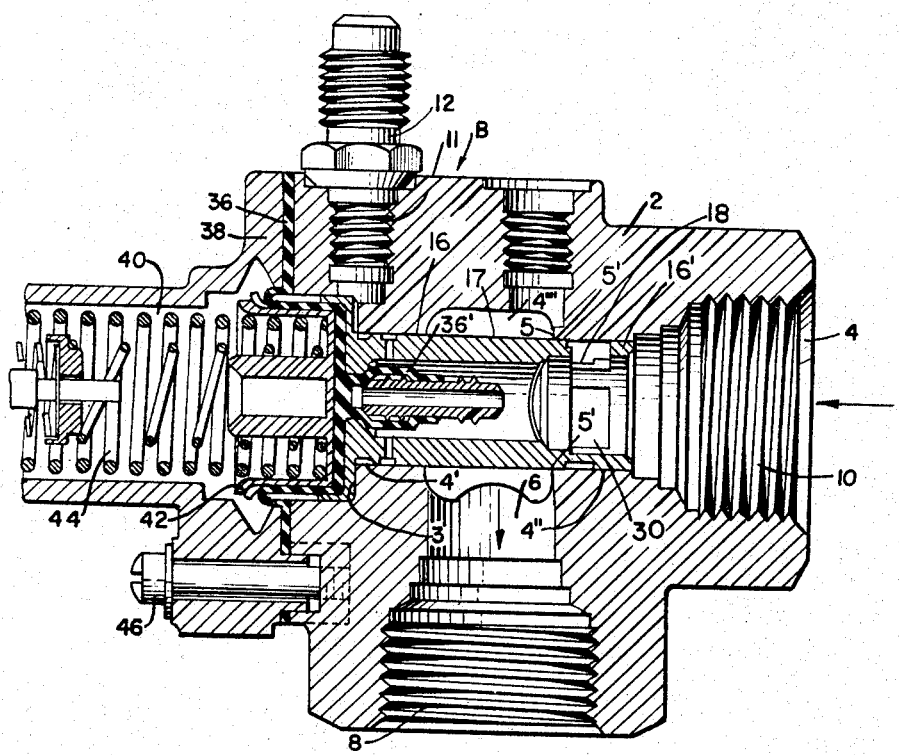
FIGURE 1 is a sectional view through the valve and valve housing.
Figures 2, 3:
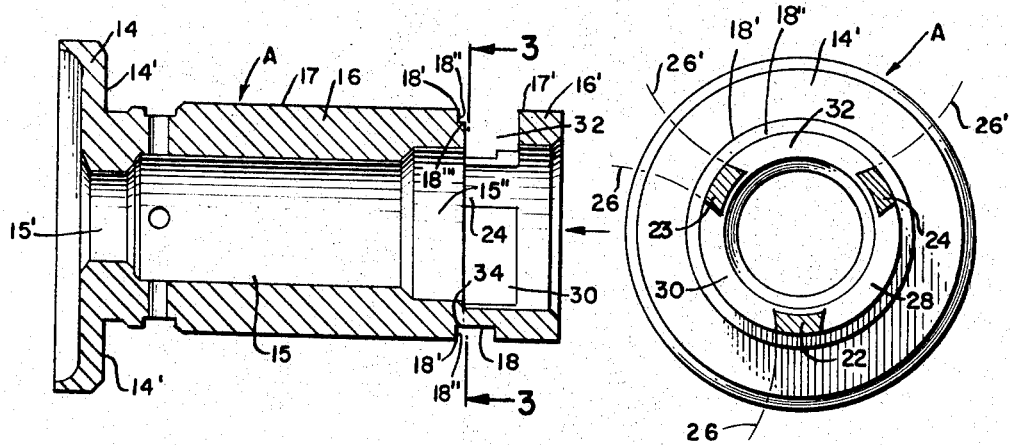
FIGURE 2 is an enlarged sectional view of the piston slide valve.
FIGURE 3 is a sectional view taken on the line 3—3 of FIGURE 2.

The piston slide valve A per se is best shown in FIGURES 2 and 3. The valve is designed to operate in combination with a valve assembly, as shown at B in FIGURE 1.

The valve assembly comprises in general a housing 2 having a longitudinal opening 4 extending therethrough, which is provided with a thread 10 for connecting the opening 4 with a supply line and is referred to as the inlet end of the housing. The portion of the opening extending between 4′ and 4″ is of accurate cylindrical form and is the portion of the opening along which the slide valve moves. Extending inwardly from each end of the portions 4′ and 4″ is an enlarged portion 4‴. Leading from the enlarged portion 4‴ to the outside of the housing 2 is an opening 6, the outer end of which is preferably threaded at 8 for connecting to means for conveying the fluid away from the valve assembly. The direction of the flow of fluid through the valve assembly is indicated by the arrows in FIGURE 1.

Adjacent the inlet side of the enlarged portion 4‴ of the opening 4 there is provided an accurately formed shoulder 5 extending about the inner edge of the portion 4″ of the opening 4. This shoulder is usually formed by machining the edge in a perpendicular plane to the axis of the opening 4, forming an inner edge 5′ which cooperates with the edge 18′ of the slide valve for valving the fluid through the opening 4 of the housing. The edge 5′ of shoulder 5 is accurately spaced from the edge of shoulder 3 of the housing B and is of less distance than the distance from the surface 14′ to the shoulder 18″ of the valve slide A, which keeps the valve normally closed when the flange 14′ of the slide valve is in contact with the shoulder 3 of the housing.

For removing the pressure from the inner end of the valve A, there is provided through the housing a threaded opening 11 provided with a proper fitting 12 which is connectable to a conduit (not shown) leading to an appropriate part of the system.

The piston slide valve A shown in FIGURES 2 and 3 is provided with a longitudinal opening 15 having an outwardly extended flange 14 at one end thereof, and may be referred to as the flanged end, and a main cylindrical portion 16 and a substantially shorter cylindrical portion 16′ extending outwardly from the end of the valve opposite the flanged end and may be referred to as the smaller end of the valve. The surface 17 of the cylindrical portion 16 is interrupted by a circumferential groove or recess 18. The distance between the inner surface 14′ of the flange 14 and the outer near edge 18′ of the groove or recess 18 must be very accurate in order to have the valve operate at its most efficient capacity. The portion 16′ has the same size diameter as the portion 16 and acts to help support the small end of the slide valve for keeping the slide valve in alignment with the central opening 4. While the portion 16′ of the slide is formed integrally with the portion 16, its outer peripheral surface is spaced outwardly from the small end of the main cylindrical portion of the valve slide. The longitudinal opening 15 extending through the slide valve is restricted at the end adjacent the flange 14, as shown at 15′. The opposite end of the opening 15 adjacent the small end of the cylindrical portion and including the portion 16′, is of a slightly larger diameter, as shown at 15″.

The cylindrical portion 16′, as stated hereinbefore, is integrally connected to the cylindrical portion 16 by the connecting portions 22, 23 and 24. These portions 22 to 24 are formed by one or more cutting tools of substantially large diameter as illustrated in FIGURE 3 by the dot-dash lines 26 and 26′. The cutting tool operates on an axis parallel with the axis of the slide valve and is of such diameter as to extend through the cylindrical portion 16 of the slide valve into the central opening 15 providing an opening between the portions 16 and 16′, as shown at 28, 30 and 32. This allows the fluid to enter the opening 15 at the end of the slide valve opposite the flange 14, as indicated by the arrow in FIGURE 2 and escape through the openings 28 to 32 to the outer peripheral edge 18′ of the groove side wall 18″ where the edge 18′ of the slide valve will be the controlling area for valving the fluid. Upon movement of the valve slide in the direction of the flange, the edge 18′ of the slide valve will pass the edge 5′ into the enlarged area 4‴ of the housing opening 4, which in turn is connected with the outlet opening 6.

The portion 16′ of the slide valve is provided with a continuous peripheral surface which, when the slide valve is heat-treated after the machining operation, will minimize its tendency to warp out of line with the main cylindrical portion 16 and would reduce the necessary grinding on the surface of the slide valve after the heat-treating process.

The cutting tool for cutting the slots 28, 30 and 32 is slightly offset toward the end portion 16' leaving a small step 18''' as a result of cutting the groove 18 as previously described. In this cutting operation the cutting tools will not need to be accurately adjusted to cut the valving edge 18' as has been the previous method used.

The tools for forming the surface 14' of the flange portion and the groove 18 are preferably mounted very accurately on the same fixture, and both the surface 14' and the groove 18 are formed at the same time and in the same operation.

As the distance between the surface 14' of the flange and the edge 18' of the cylindrical portion 16 of the valve must be held to a very close tolerance the forming of the surface 14' and the valving edge 18' has in the past been difficult when done in separate operations. With the present structure wherein these two operations may be done in a single operation and both forming tools being fixed to the same fixture, the valve slide may be made more accurately and rapidly then by using the cutting tool for the openings to also gauge the cut of the edge 18'. Also, cutting a continuous groove 18 provides a continuous edge 18' into the outer surface 17 of the valve slide, which makes for a better valving action than if parts of the slide valve extend flush with the outer cylindrical surface of the slide valve.

The slide valve is shown with a guide portion 16' having a continuous cylindrical surface 17' being separated from the major portion 16 of the valve slide by rectangular openings 30 to 32. However, the openings may be of any convenient shape such as round, square or other convenient shapes. The guide portion 16 may also take different forms. Instead of a continuous cylindrical surface 17' the portion 16' may be slotted radially or the guiding elements may be in the form of a plurality of extensions such as by extending the portions 22, 23 and 24 and having their outer end portions adapted to bear against the wall 4'' of the opening 4.

As mentioned before the slide valve A is carried in a housing 2 having its piston like portions 16 and 16' adapted to slide within the longitudinal cylindrical portions 4' and 4'' of the housing. The longitudinal opening 4 in the housing 2 is provided at one end with a shoulder 3 having a diameter that will slidably receive the flange 14 of the valve, and is the end of the opening in the housing through which the slide valve is inserted into the housing. On the flange end of the slide valve is a gasket 36, and over the gasket 36 is a flange 38 having an elongated opening 40 extending therethrough to coincide with the opening 4 of the housing 2. Adjacent the opposite side of the gasket is a cup-shaped member 42 for holding the gasket in contact with the outer surface of the flange 14 of the slide valve. The slide valve is held inwardly wherein, the inner face of the flange is normally positioned adjacent the shoulder 3 of the housing 2 by the spring 44. The gasket 36 is secured to the slide valve A by an extension of the gasket 36' extending through the opening 15' frictionally engaging the same.

The outer edge of the gasket 36 is held between the flange 38 and the housing 2 by the bolts 46.

In operation, fluid pressure enters the opening 4 in the housing opposite the small cylindrical end 16'' of the slide valve, as indicated by the arrow and places pressure on the valve slide against the compression of the spring 44. When sufficient pressure is presented by the fluid, the valve slide moves in the direction of the spring and the edge 18' of the valve slide moves inwardly until it passes the edge 5' of the shoulder 5 allowing the fluid to pass into the enlarged portion 4''' of the opening 4. The fluid enters the open portion 4''' and passes to the passage 6 and out through a conduit connected to the threaded portion at the outer end of the passage 6.

Many of the advantages of the improved valve slide have already been noted. Also the steps and manner of manufacturing the valve provide a new and novel method of forming the valve. Being able to form the face 14' and the groove 18 in the same operation speeds up the production of the valve slide, and cutting the openings 28 to 32 outwardly from the edge 18' of the groove eliminates to a great extent the use of highly skilled labor.

While a specific form of the invention has been shown and described, it is not intended as a limitation as the scope of the invention is best defined in the appended claims.

I claim:

1. A unitary piston, slide valve comprising an elongated uniform outer diameter cylindrical portion having an annular flange at one end thereof and a longitudinal opening therethrough forming a wall between the outer surface of the cylindrical portion of the piston and the central opening, said valve having a plurality of circumferentially spaced, radial openings formed in substantially the same transverse plane intermediately of said cylindrical portion and extending through the valve wall, said cylindrical portion including a circumferential groove substantially spaced from the annular flange and having sides and a bottom portion, said groove having at least one continuous side wall on the side of the groove nearest said annular flange and partially overlying the said radial openings, the opposite side of the radial openings being spaced from the said opposite end of the cylindrical portion for allowing the portion extending between the radial openings and said opposite end to be provided with a continuous cylindrical outer guide surface, a portion of said cylindrical surface, remote from said annular flange extending partially into said groove.

2. A unitary piston, slide valve as defined in claim 1 wherein a portion of the bottom of the groove overlies the radial openings, and portions of said uniform outer diameter cylindrical portion project in flanking relation to said radial openings and terminate short of said groove.

3. The method of producing a unitary-piston, slide valve comprising the steps of:
   machining a cylindrical surface on an elongated element having a longitudinal through-opening and an annular flange at one end;
   machining a plurality of circumferentially spaced radial openings communicating from said longitudinal through-opening and the cylindrical surface and producing a plurality of valve-control edges adjacent and spaced from the other end of said cylindrical surface;
   machining an annular groove at one side of said radial openings defining a second valve annular control edge and machining an adjacent surface of said annular flange in dimensional control relationship with respect to said second valve control edge whereby said groove forms two spaced, cylindrical guide surfaces extending away from said groove and over substantially the entire extent of said cylindrical surface.

4. A valve assembly comprising in combination:
   (a) a housing having a cylindrical opening therethrough, wherein at least a part thereof of uniform diameter;
   (b) said housing having a second opening intersecting the first opening and extending at least to one side of the housing, at least a portion of the second opening being larger in diameter wherein it intersects the first opening;
   (c) a unitary piston, slide valve comprising an elongated, uniform outer diameter cylindrical portion having an annular flange at one end thereof and a longitudinal through opening forming a wall between the outer surface of the cylindrical portion of the piston and the central opening, said cylindrical portion slidably engaging the said cylindrical opening within the housing, said valve having a plurality of intermediate radial openings formed in substantially the same plane position adjacent and spaced from the opposite end of the cylindrical portion extending through the valve wall, said cylindrical portion including a circumferential groove extending into portions of said slide valve and flanking said radial openings, said groove defining two longitudinally spaced cylindrical guide surfaces on opposite sides thereof and having at least one continuous annular side wall extending into the cylindrical surface inwardly adjacent the said radial openings, the opposite side of the radial openings including coplanar control edges spaced from the said opposite end of the valve for allowing the portion extending between the radial openings and said opposite end to be provided with continuations of the cylindrical outer surface;

(d) a positioning shoulder on said housing for the piston valve formed concentric within the first mentioned opening in the housing engaging the annular flange on the piston valve;

(e) resilient means engaging the annular flange normally urging the said piston flange against the said shoulder;

(f) the distance from the inner surface of the annular flange closest to said radial openings to the near side of the circumferential groove, being such as to dispose the groove beyond the enlarged area of the second mentioned opening when the flange is positioned against the said shoulder and operable in the opposite direction against the said resilient means for a distance to position the near side of the groove within the enlarged portion of the opening of the second mentioned opening.

5. A unitary piston slide valve comprising an elongated, uniform outer diameter cylindrical portion having an annular flange at one end thereof and having a longitudinal through-opening forming a cylindrical wall between the outer surface of the cylindrical portion of the piston slide valve and the through opening thereof, said cylindrical portion being provided with an intermediate continuous groove spaced from the annular flange and adjacent the end of the cylinder opposite the flange, said groove being in a plane perpendicular to the elongated axis of the piston slide valve, guide means comprising a portion of said cylindrical portion and extending into the groove and on the side of the groove opposite the flange, the said cylindrical portion having a plurality of radial openings extending therethrough positioned to the side of the groove and flanked by the guide means, at least a portion of the groove closest to the flange comprising a continuous, annular surface defining a peripheral control edge in accurately spaced relation from said flange.

References Cited

UNITED STATES PATENTS 2,877,795  3/1959  Cocklin _____ 137—625.25 X
2,896,662  7/1959  Thomas _____ 137—625.48 X
2,928,417  3/1960  Buckner et al. _____ 137—538

HENRY T. KLINKSIEK, *Primary Examiner.*